G. H. CHAPEL.
OPTICAL LENS MOUNTING.
APPLICATION FILED MAY 28, 1919.
1,362,226.
Patented Dec. 14, 1920.
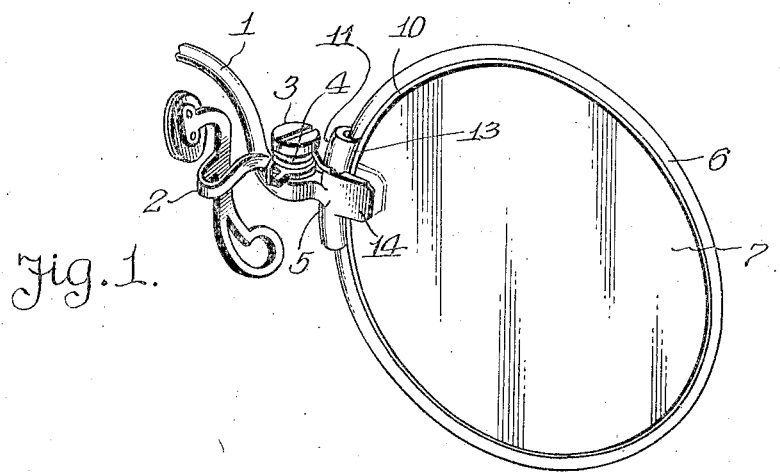
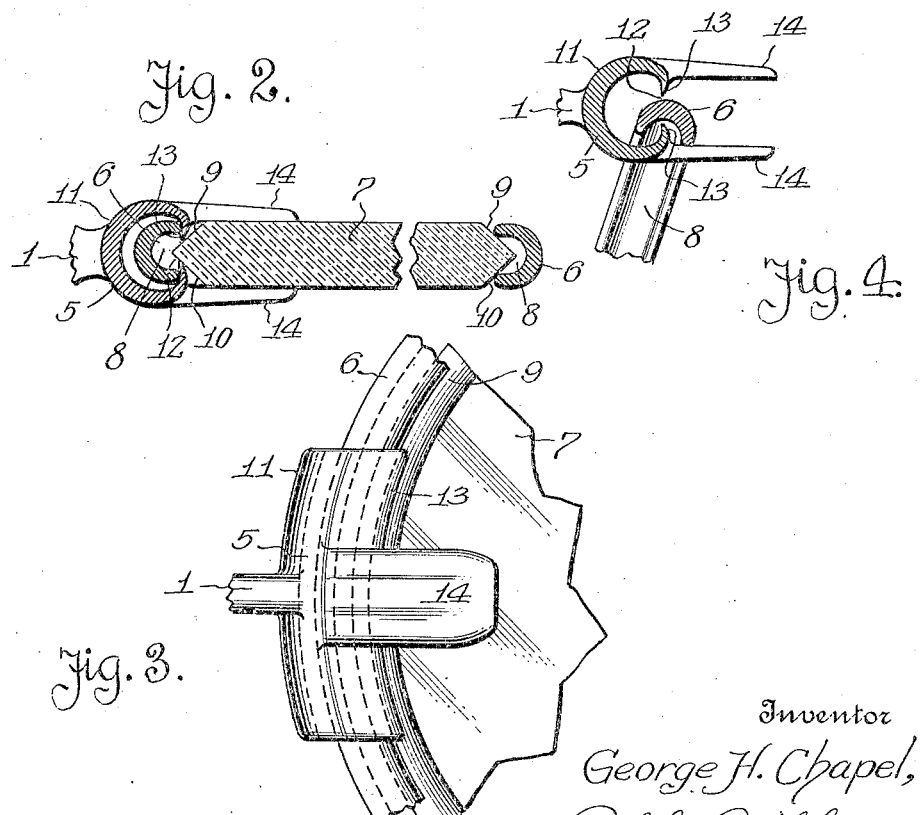
Inventor
George H. Chapel,
By
Attorneys

UNITED STATES PATENT OFFICE.

GEORGE H. CHAPEL, OF HOWELL, MICHIGAN.

OPTICAL LENS-MOUNTING.

1,362,226.  Specification of Letters Patent.  Patented Dec. 14, 1920.

Application filed May 28, 1919. Serial No. 300,400.

*To all whom it may concern:*

Be it known that I, GEORGE H. CHAPEL, a citizen of the United States of America, residing at Howell, in the county of Livingston and State of Michigan, have invented certain new and useful Improvements in Optical Lens-Mountings, of which the following is a specification, reference being had therein to the accompanying drawings.

This invention relates to eye-glasses, spectacles, etc., and more particularly to means for holding the lenses of such devices.

The object of the invention is to provide simple means for securing a lens rim with a lens therein to a nose piece or bridge in such a manner that the lens or rim may be quickly detached and when in place, both are securely and rigidly held without the necessity for perforating the lens and in such a manner as to relieve the rim from undue strains and permit of the use of a very light rim. A further object is to provide a construction having certain other new and useful features, all as hereinafter more fully described.

With these and other ends in view, the invention consists in the matters hereinafter set forth and more particularly pointed out in the appended claims, reference being had to the accompanying drawing in which—

Figure 1 is an enlarged perspective view of a portion of a pair of eye-glasses illustrative of an embodiment of the invention;

Fig. 2 is a further enlarged sectional detail of a lens, a rim and a clip, illustrating the manner in which the parts are interlocked;

Fig. 3 is a detail showing the holding clip or member in elevation with a portion of a rim and lens held thereby; and Fig. 4 is a sectional detail illustrating the manner in which the rim is operated to detach it from the clip.

The present popular styles of eye-glasses and spectacles have rims of shell or celluloid and great difficulty has been encountered in attaching the rims to the bridge or nose piece in such a manner as to give a rigid construction and permit their removal when broken. It is also a well known fact that where the lenses are secured in place by screws or the like passing through holes therein, these lenses are very easily broken, they not only being weakened by such perforations but also put under a strain by the rigid attachment of the bridge directly thereto. The fragile rims are also put under a heavy twisting strain when the bridge is directly and rigidly attached thereto and it is practically impossible to make a connection which will rigidly hold the rims with the lenses therein, against bending or twisting at the points of connection. Further, when there is a direct connection between the rim and bridge, it is very difficult to detach a rim when broken or when it becomes necessary to remove it for the purpose of repairing the bridge or other parts of the mounting. Where the bridge is directly and permanently secured to the shell rim, it is necessary because of the strains to which the rim is subjected, to make it comparatively heavy and this detracts from the appearance.

In the drawing, an eye-glass mounting is illustrated, but it will be understood the invention may be applied as well to spectacles having riding bows and the like, and further, that the rim or rims may be made of metal instead of a more fragile material, such as shell or celluloid, as illustrated.

The mounting illustrated comprises the usual bridge 1 which is formed at each end with the usual seat or place of attachment for the pivoted nose piece 2 which is attached by means of the screw stud 3 and yieldingly held in position to grip the nose of the wearer, by a coiled spring 4 on the stud, all arranged in an old and well known manner. Formed integral with each end of the bridge is a clip, designated as a whole by the numeral 5, for holding the rim 6 and lens 7 which are of the usual construction, the rim being an endless ring formed with a groove 8 in its inner side to receive the beveled edge of the lens formed by the meeting of the two edge surfaces 9 and 10 which are inclined to the planes of the opposite faces of the lens. The lens is detachably held in its rim in the usual manner by springing the rim sufficiently to enter the beveled lens edge into said groove.

The clip 5 comprises a tubular member 11 formed integral with the end of the bridge 1 and curved in the direction of its length to conform substantially to the curvature of the rim 6 which is entered therein through a slot 12 in the outer side of the member. This tubular member 11 is of considerably greater internal diameter than the external cross-sectional diameter of the rim, and the width of the slot 12 in said tubular member is considerably less than the cross-sectional diameter of said rim. In order to insert or remove the rim from this tubular member, it is necessary to turn the rim at an angle thereto as illustrated in Fig. 4, so that one edge of the slot may be engaged within the groove of the rim, the slot being of sufficient width to permit the wall of the rim to pass freely therethrough, the thickness of said wall being much less than the outside cross-sectional diameter of the rim.

After the rim has been so inserted in the tubular member of the clip, the lens is then inserted in the rim in the usual manner, the beveled faces 9 and 10 of the edge of the lens being placed against the edges of the slot 12 in the clip member 11 so that when the lens is forced to place within the rim, said rim will be drawn tightly against the inner side of the thinned and inwardly bent edge portions 13 of the member 11 forming the edges of the slot 12 therein, and the beveled edge of the lens will be wedged into the slot. These thin edge portions at the sides of the slot are thus locked by the insertion of the lens, between said lens and rim, and the engagement of the beveled edge of the lens in the slot tends to hold the lens and rim properly positioned relative to the clip. The interposition of the edges 13 of the clip member between the rim and lens, also causes the lens to more firmly engage the groove in the rim and as the rim engages the tubular clip member along said edges only, lateral pressure on the rim which would tend to turn it within the clip, does not put undue strain upon the rim. This turning movement of the rim in the clip member is prevented by a pair of parallel ears 14 projecting from the member 11 intermediate the ends thereof to engage the side surfaces of the lens when the same is in place. By the engagement of these parallel ears, which are integral with the tubular clip member, with the opposite sides of the lens, said rim is firmly held against turning within the clip and the wedging action of the lens within the slot 12 also tends to prevent such turning and keeps the rim under tension without putting undue strain thereon. Because the rim is firmly and rigidly held without putting undue strain upon the rim, said rim may be made very light and small in cross-sectional diameter, even when formed of fragile material.

The lens and rim may be quickly detached from the clip by first removing the lens by springing the rim to disengage the beveled edge of the lens from the rim groove, and then turning the rim to such an angle relative to the clip, that it may be lifted out through the slot therein in the manner described. The rim may therefore be quickly detached at any time for the purpose of replacement or repair, or the repair of other parts of the mounting, it being necessary to so remove the rim when the rim is formed of celluloid and parts of the mounting are to be soldered.

In this construction, the rim is rigidly and detachably attached and the lens securely held without the necessity for making holes in the lens or securing the rim to the clip in such a manner that it may not be readily detached therefrom, the construction being such that the insertion of the lens locks the rim in the clip with the clip interposed between the rim and lens edge and the lens is itself firmly held in its rim. The providing of the clip or suitable holding device for the rims, with rigid laterally projecting ears or members to engage the sides of the lens, provides a stiff rigid connection and relieves the parts of twisting strains which tend to cause the parts to become loosened or broken in use.

Obviously, changes may be made in the form, construction and arrangement of parts within the scope of the appended claims and I do not therefore limit myself to the construction shown.

Having thus fully described my invention, what I claim is:

1. In a device of the character described, the combination with a bridge, a rim and a lens, of means for connecting the rim to the bridge interlocked with the rim by the insertion of the lens in the rim.

2. In a device of the character described, means for connecting lens rims to a support therefor comprising a member to receive a portion of a rim and within which the rim is detachably held by the insertion of a lens in the rim.

3. In a device of the character described, means for connecting lens rims to a support therefor comprising a member to receive a portion of a rim and to be engaged by a lens inserted in the rim to hold the rim in said member.

4. In a device of the character described, means for connecting lens rims to a support therefor comprising a member adapted to embrace portions of the opposite sides and edges of a rim and having projections to engage the opposite faces of a lens in the rim and hold the rim against turning in said member.

5. In a device of the character described, means for connecting lens rims to a support therefor comprising members adapted to embrace portions of the opposite sides and edges of the rims and having projections to engage the opposite faces of lenses in the rims, said projections being unattached to the lenses.

6. In a device of the character described, means for connecting a lens rim to a support therefor comprising a member adapted to receive a rim and to interlock therewith by a relative lateral swinging movement of said member and rim after engagement of the rim with said member.

7. In a device of the character described, means for connecting lens rims to a support therefor comprising a member adapted to receive a rim and to interlock therewith by a relative turning movement of said member and rim, and means for holding said member and rim against relative turning.

8. In a device of the character described, means for connecting lens rims to a support therefor comprising means adapted to interlock with a rim by a relative turning of said means and rim, and means for engaging the faces of a lens inserted in said rim to hold said member and rim against relative turning.

9. In a device of the character described, means for connecting lens rims to a support therefor comprising a member adapted to receive a rim and to interlock therewith by a relative turning of said member and rim, and opposed members projecting from said member to receive between them a lens inserted in the rim and prevent relative turning of the member and rim.

10. In a device of the character described, means for connecting lens rims to a support therefor comprising a member to receive a portion of a rim and within which the rim is adapted to be detachably held by the insertion of a lens in the rim.

11. In a device of the character described, means for connecting lens rims to a support therefor comprising a member adapted to be clamped between a rim and the edge portion of a lens by the insertion of the lens in the rim.

12. In a device of the character described, means for connecting lens rims to a support therefor comprising a member adapted to be clamped between a rim and the edge portion of a lens by the insertion of the lens in the rim, and means on said member for engaging opposite faces of the lens to prevent relative turning of said member and rim.

13. In a device of the character described, means for connecting lens rims to a support therefor comprising a tubular member having a longitudinal slot in one side to receive a lens rim and the edges of said slot arranged to be engaged by the edge of a lens inserted in the rim for detachably holding the rim in said member.

14. In a device of the character described, the combination with a lens rim and a lens, of means for connecting the rim to a support therefor comprising a tubular member having a slot in one side of less width than the longest cross-sectional diameter of the rim, the edges of said slot being adapted to engage the edge of the lens when inserted in the rim.

15. In a device of the character described, the combination with a lens rim and a lens, of means for connecting the rim to a support therefor comprising a tubular member having a slot in one side of less width than the longest cross-sectional diameter of the rim, the edges of said slot being adapted to engage the edge of the lens when inserted in the rim, and laterally projecting ears on said tubular member at the sides of said slots to engage the side surfaces of the lens.

16. In an optical lens mounting, the combination of a bridge, clip members integral with the ends of the bridge, a rim loosely engaging each clip member, and a lens in each rim engaging the clip member and detachably locking the rim thereto.

17. In an optical lens mounting, the combination of a bridge, clip members integral with the ends of the bridge, rims engaged with the clip members by a turning movement of the rims relative thereto, a lens in each rim for holding the rims engaged with the clip members, and ears on each clip member to engage the lens in the rim held thereby and hold the rims against turning relative to the clip members.

18. A device of the character described comprising a continuous lens rim to receive a lens, and a support therefor arranged to engage between the rim and the lens inserted in the rim to detachably hold the rim engaged with the support by the insertion of the lens in the rim.

19. A device of the character described comprising a supporting member, a continuous lens rim detachably engaging said support, and a lens engaged in the rim and contacting the support opposite that portion of the rim which is in contact with the support, whereby said rim is drawn into and held in engagement with said support by the insertion of the lens in the rim.

20. A device of the character described comprising a rim and lens tubular holding member, said member having a slot in its inner side and the edges thereof on opposite sides of said slot extending inwardly in directions transversely of the plane of the lens and rim, and the said member being curved lengthwise to correspond to the curvature of the portion of the rim engaged thereby, a rim having a portion situated in said tubular member underneath the inwardly extending edge portions thereof, and a lens seated in the said rim and contacting with the edge of the inwardly extending edge portions of said member and operating to clamp the said rim against the said inwardly extending edge portions.

21. In an eyeglass mounting, the combination of a bridge having at its opposite ends tubular members for holding the rims and lenses, said members having slots in their inner sides the edge portions of which on opposite sides of said slots extending inwardly in directions transversely of the plane of the lenses and rims, and the said members being curved lengthwise to correspond to the curvature of the portions of the rims engaged thereby, rims having portions situated in said tubular members underneath the inwardly extending edge portions thereof, and lenses situated in the said rims and contacting with the edges of said tubular members on opposite sides of the said slots and operating to hold the portions of the said rims within the said tubular members in contact with the inwardly extending edge portinos of the latter.

In testimony whereof I affix my signature in the presence of two witnesses.

GEORGE H. CHAPEL.

Witnesses:
ANNA M. DORR,
CHAS. W. STAUFFIGER.